United States Patent [19]

Sipos et al.

[11] Patent Number: 5,702,747
[45] Date of Patent: Dec. 30, 1997

[54] PROCESS FOR DECAFFEINATING AQUEOUS CAFFEINE-CONTAINING EXTRACTS

[75] Inventors: Stefan Sipos, Bremen, Germany; Gary V. Jones, Stettlen, Switzerland

[73] Assignee: Kraft Foods, Inc., Northfield, Ill.

[21] Appl. No.: 704,033

[22] Filed: Aug. 28, 1996

Related U.S. Application Data

[63] Continuation of Ser. No. 376,313, Jan. 20, 1995, abandoned.

[51] Int. Cl.$^6$ ................................ A23F 3/20; A23F 5/16
[52] U.S. Cl. .................... 426/422; 426/423; 426/427; 426/432; 426/433; 426/435; 544/274
[58] Field of Search ........................ 426/422, 432, 426/423, 427, 435; 544/274

[56] References Cited

U.S. PATENT DOCUMENTS

| 4,260,639 | 4/1981 | Zosel | 426/478 |
|---|---|---|---|
| 4,324,840 | 4/1982 | Katz | 426/422 |
| 5,208,056 | 5/1993 | Fischer et al. | 426/427 |

FOREIGN PATENT DOCUMENTS

| 16 92 249 | 5/1971 | Germany. |
|---|---|---|
| 2 005 293 | 11/1971 | Germany. |

OTHER PUBLICATIONS

Patents Abstracts of Japan. (Hajime Oyabu et al) Abs Grp No. C0695, vol. No. 14, No. 109 Published Feb., 28, 1990.

Patent Abstracts of Japan, vol. 17, No. 190 (C–1048) 1992, JP-A-04 341,164 (Kuraray Chem Corp).

M. Buck and H.–G. Gunter, "Adsorption mit Aktivkohlefasermaterial –ein Abluftreinigungsverfahren in Kombination mit anderen Techniken," *VDI Berichte* Nr. 730 (1989), pp. 431–443.

*Primary Examiner*—Anthony J. Weier
*Attorney, Agent, or Firm*—Thomas A. Marcoux; Thomas R. Savoie

[57] ABSTRACT

A process is described for decaffeinating caffeine-containing aqueous extracts with which the caffeine is extracted selectively with activated carbon fibers.

12 Claims, No Drawings

PROCESS FOR DECAFFEINATING AQUEOUS CAFFEINE-CONTAINING EXTRACTS

This application is a continuation of application Ser. No. 08/376,313, filed Jan. 20, 1995 now abandoned.

The present invention relates to a process for decaffeinating aqueous caffeine-containing extracts from coffee, tea or other vegetable sources.

The decaffeination of coffee has been the subject of numerous investigations and various processes have been proposed. Essentially two process principles have gained acceptance commercially, namely, on the one hand, the decaffeination of aqueous green coffee extracts with the aid of activated carbon and, on the other hand, the decaffeination of green coffee with the aid of supercritical $CO_2$.

EP-B-O 008 398 describes a process for decaffeinating green coffee with which the caffeine is extracted by means of an aqueous liquid and adsorbed from the liquid onto a preloaded adsorbent, the adsorbent being preloaded with at least one water-soluble green coffee constituent, which is not to be bound onto the adsorbent out of the liquid, or a substance having the same molecular structure or size, and the degree of loading being adjusted such that there is adsorption equilibrium between the liquid and the adsorbent with respect to the said green coffee constituent or, resp., constituents with the exception of the caffeine. That process is time-consuming and problematic in respect of the preloading of the activated carbon. At the same time, the carbon preloaded with, for instance, sugar is still not selective enough in respect of the caffeine to be extracted. Other green coffee constituents are also adsorbed.

DE-C-2 005 293 describes a process for decaffeinating green coffee with which the green coffee beans are treated with moist $CO_2$ in supercritical state, especially at a temperature of 40° to 80° C. under a pressure of 120 to 180 at. The $CO_2$ in the $CO_2$ stream can be removed from the circulating $CO_2$ stream by pressure release or by use of activated carbon. Although that process is very good in view of the selectivity of the caffeine to be extracted, the investment costs for such a process on an industrial scale are high.

It is the problem underlying the invention to find a simple attractive priced process for decaffeinating aqueous caffeine-containing extracts which does not have the above disadvantages.

The problem is solved by a process for decaffeinating caffeine-containing aqueous extracts with which the caffeine is adsorbed from the liquid extracts onto an adsorbent, and which is characterized in that activated carbon fibers are used as adsorbent.

The use of activated carbon fibers for exhaust air decontamination is known. Thus, an alternative process for exhaust air decontamination using activated carbon fibers was developed a few years ago in Japan, and that being as an alternative to processes with which granulated activated carbon had been used for exhaust air decontamination. M. Buck and H. G. Günther reported on that in an article entitled "Adsorption mit Aktivkohlefasern-Ein Abluftreinigungsverfahren in Kombination mit anderen Techniken", VDI Berichte No. 730, 1989, page 431 et seq.

The use of activated carbon fibers in place of granulated activated carbon in order to bind the caffeine which is in the vapor phase with the process of DE-C-2 005 293 as described above has proven to be impractical. Tests have shown that the activated carbon fibers can thereby be loaded with maximum 5% caffeine. Granulated activated carbon, on the other hand, can with that process nowadays be loaded with up to 30%.

It has, however, surprisingly turned out that activated carbon fibers can be used with great success with the decaffeination of aqueous caffeine-containing extracts. It is particularly surprising that activated carbon fibers are extremely selective in respect of caffeine, i.e. that a complicated preloading with sugar is no longer necessary. The granular activated carbon has to be preloaded with sugar with the process of EP-B-0 008 398 because otherwise numerous green coffee constituents which are decisive for the taste of the roasted coffee are bound to the activated carbon. The sole green coffee constituent which is bound to the activated carbon fibers in addition to caffeine is chlorogenic acid. None of the other essential green coffee constituents are bound to activated carbon fibers. It is particularly surprising that sugars are not adsorbed onto activated carbon fibers at all because, as is known in the art, up to 11 to 13% of sucrose and/or other sugars are very tightly bound to granular activated carbon.

In addition to the particularly high selectivity with respect to caffeine, it is also surprising that activated carbon fibers can be loaded with caffeine up to about 40% by weight. Upon using activated carbon preloaded with sugar, as was necessary hitherto in the prior art, degrees of loading of maximum 5 to 7% caffeine were able to be achieved.

Considering that the use of activated carbon fibers in the vapor phase, that is, for instance, with the process of DE-C-2 005 293, cannot come under consideration, the applicability of activated carbon fibers for decaffeinating aqueous caffeine-containing extracts is already from the outset surprising. The extraordinary selectivity and the achievable high degrees of loading are, however, particularly surprising.

The process of the invention can be employed both with aqueous green coffee extracts and with aqueous roasted coffee extracts, with aqueous tea extracts and with other aqueous caffeine-containing extracts from other vegetable sources. The preparation of aqueous green coffee or roasted coffee extracts, of aqueous tea extracts and of other caffeine-containing extracts from other vegetable sources is known in the prior art. The preparation of aqueous green coffee extracts is explained, for example, in EP-B-0 008 398.

All possible activated carbon fibers come under consideration as activated carbon fibers. Activated carbon fibers are usually prepared by carbonizing and activating phenol resin fibers, polyacrylonitrile fibers and also rayon fibers. Carbon fibers spun directly from pitch and activated also come under consideration. Activated carbon fibers usually have a diameter of about 10 µm and can be used in the form of fabrics, nonwovens, fiber mats and feltlike materials. According to manufacturer statements, the surface area of the fibers is in the range of about 1000 to 1600 m²/g, and the pore diameters are in the range of 5 to 100 Å.

Pressure and temperature are not critical process parameters with the process of the invention. Whereas the pressure is normally at environmental, the temperature can be from room temperature to 140° C., preferably 60° C. to 90° C. and especially preferred at about 80° C.

As already mentioned above, merely chlorogenic acid in addition to caffeine is adsorbed from the aqueous caffeine-containing extracts onto the activated carbon fibers. In order to avoid a loss of chlorogenic acid, the activated carbon fibers can be preloaded with chlorogenic acid. To that end, the activated carbon fibers can be immersed for a short period in an aqueous chlorogenic acid solution. In spite of complete preloading of the activated carbon fibers with chlorogenic acid, high degrees of caffeine loading are possible. It is speculated that chlorogenic acid is adsorbed onto the activated carbon fibers at sites different from those at which the caffeine is adsorbed.

On the other hand, it is also possible to remove the caffeine from the caffeine-containing extracts together with the chlorogenic acid. Chlorogenic acid has been described in the past as cause for stomachache occurring with some persons after coffee consumption, and processes had for that reason been sought for selectively removing chlorogenic acid, thus, e.g., with the process described in DE-C-1 692 249.

The caffeine adsorbed by activated carbon fibers can be recovered very easily and the activated carbon fibers regenerated by simple means. The caffeine can be removed from the activated carbon fibers by simple and very effective means by washing with suitable solvents such as, e.g., $MeCl_2$. The thermal sublimation of the caffeine is suitable for the recovery of the caffeine, and which can be achieved in a simple manner by heating the activated carbon fibers and the sublimed caffeine being condensed elsewhere. The chlorogenic acid is preferably removed with suitable solvents, the subsequent total removal of solvent residues from the activated carbon fibers being easily possible, which is not possible in the case of granulated activated carbon. The liberated caffein-adsorbing sites of the activated carbon fibers are fully restored; a high temperature oxidative reactivation of the adsorbent is not needed. The adsorbed chlorogenic acid remaining on the carbon can optionally be recovered with a good degree of purity using suitable alkaline solutions of NaOH or $Na_2CO_3$.

A major advantage of the process of the invention is to be seen in the fact that the carbon fibers have not to be reactivated, whereas prior art granulated activated carbon does. The carbon fibers which have been freed from the caffeine can be reused immediately for further decaffeinating operations.

Another major advantage is the surprising ease of recovery of the pure caffeine and the pure chlorogenic acid which are valuable compounds of steadily increasing economic interest.

The most surprising aspect of the present invention, however, is the high selectivity of carbon fibers for caffeine and chlorogenic acid and that—contrary to the granulated activated carbon—sugar is not adsorbed by carbon fibers.

EXAMPLE 1

25 g of sugar preloaded granulated activated carbon (GAC) and 2.5 or 5.0 g of activated carbon fiber (ACF) (as is), resp., were shaken in 250 ml of caffeine-rich green bean coffee extract from a commercial plant in a water bath thermostat for two and four hours, resp. The adsorbent was then separated by filtration.

The starting and the resultant extracts were analyzed for total solids, caffeine, saccharose and chlorogenic acid. The resulting carbon loading was measured by extracting with $MeCL_2$.

The data obtained are shown in the following table:

TABLE

|  | CONTACT TIME | TOTAL SOLIDS % | SACCHA- ROSE % db | CHLOROGENIC ACID % db | CAFFEINE % db/g/l | ADSORBENT LOADING % dvcb** |
|---|---|---|---|---|---|---|
| STARTING EXTRACT #1 | — | 19.5 | 31.5 | 9.2 | 3.2/6.2 | — |
| SUGAR-PRELOADED, GAC-TREATED EXTRACT (25 g/250 ml) | 2 hrs | 18.8 | 38.1 | 6.3 | 0.9/1.7 | 3.0 |
|  | 4 hrs | 18.9 | 38.8 | 6.3 | 0.5/1.0 | 3.1 |
| ACF (as is)* - TREATED EXTRACT (2.5 g/250 ml) | 2 hrs | 19.4 | 34.5 | 9.3 | 1.9/3.7 | 22.0 |
|  | 4 hrs | 19.1 | 34.8 | 9.4 | 2.1/3.8 | 21.0 |
| STARTING EXTRACT #2 | — | 22.7 | 33.4 | 13.8 | 2.2/5.1 | — |
| ACF (as is)* - TREATED EXTRACT (5.0 g/250 ml) | 2 hrs | 22.1 | 36.1 | 11.9 | 0.3/0.8 | 20.3 |

*typical 14% moisture
**dvcb = dry virgin carbon basis

The tests with Extract 1 show that the activated carbon fibers are substantially more selective than the activated carbon preloaded with sugar. The losses of total solids were quite clearly less upon using activated carbon fibers. There is deserving of particular heed the fact that only 2.5 g of activated carbon fibers were used whereas, over against that, 10 times the amount, i.e. 25 g, of activated carbon loaded with sugar was used. The degrees of loading are also correspondingly different, namely about 21 to 22% with the activated carbon fibers over against only 3.0 to 3.1% with the activated carbon loaded with sugar.

The test with Extract 2 with which double the amount of activated carbon fibers, namely 5.0 g, was used shows that substantially more caffeine can be removed from the extract in comparable time, namely in two hours, than upon use of activated carbon preloaded with sugar, but at the same time hardly a loss of total solids from the extract is to be observed.

The tests show as a whole that the activated carbon fibers are substantially more selective than the granulated activated carbon preloaded with sugar and clearly higher degrees of loading of the activated carbon fibers with caffeine are possible in comparison with the degrees of loading which are achievable with granulated activated carbon. In order to remove comparable amounts of caffeine from the extracts in comparable times, based on the weight, only one fifth of activated carbon fibers is needed in comparison with granulated activated carbon with at the same time greatly improved selectivity. The results show the surprisingly better results which are possible with the decaffeination of aqueous coffee extracts using activated carbon fibers in comparison with granulated activated carbon.

EXAMPLE 2

500 ml of a 20.8% total solids/5910 ppm caffeine green bean extract were decaffeinated with 13.7 g (dry) ACF. Contacting parameters were 80° C./1 hr.

After intermediate washings and centrifugings, the ACF was extracted with MeCl₂ for caffeine and washed with 0.1 NaOH to desorb non-caffeine solids.

The final activity of the recovered ACF as referred to caffeine was measured.

Results:
a) decaffeination: 82.5%
b) loading level of ACF (dvcb): 24.1%
c) selectivity: 79% i.e.
- a) Starting extract 0.871 caffeine Treated extract 0.152 caffeine
- b) 0.404 g caffeine/2.205 g loaded carbon (dry) (equiv. 1.68 g dvcb)

| c) | | ACF | (dry) | |
|---|---|---|---|---|
| Starting weight | | " | " | 13.7 g |
| Loaded weight | | " | " | 18.0 g |
| After MeCl₂ extraction | | " | " | 14.6 g |
| After NaOH 0.1 N wash | | " | " | 13.7 g |
| Activity of "regenerated" (at 4400 ppm in sol.; equivalent to starting conditions) | | " | " | 44.2 g |

This example shows that ACF can be fully regenerated by means of a caffeine recovery followed by a wash with a dilute alkaline solution. The complete regeneratability of the ACF is important because ACF is relatively expensive in comparison with granulated activated carbon.

We claim:

1. Process for decaffeinating caffeine-containing aqueous extracts selected from the group consisting of aqueous green coffee extracts, aqueous roasted coffee extracts and aqueous tea extracts which comprises contacting said extract with activated carbon fibers which have not been preloaded and selectively adsorbing only caffeine and chlorogenic acid onto the activated carbon fibers.

2. Process according to claim 1 wherein the decaffeination is carried out at temperatures from 60° to 90° C.

3. Process according to claim 1 wherein the carbon fibers are used in the form of fabrics, nonwovens, fiber mats or feltlike materials.

4. Process according to claim 1 wherein the activated carbon fibers can adsorb caffeine up to about 40% by weight.

5. Process for decaffeinating caffeine-containing aqueous green coffee extracts which comprises contacting said extract with activated carbon fibers which have not been preloaded and selectively adsorbing only caffeine and chlorogenic acid onto the activated carbon fibers without adsorbing sugar and other green coffee constituents onto the activated carbon fibers.

6. Process according to claim 5 wherein the decaffeination is carried out at temperatures from 60° to 90° C.

7. Process according to claim 5 wherein the carbon fibers are used in the form of fabrics, nonwovens, fiber mats or feltlike materials.

8. Process according to claim 5 wherein the activated carbon fibers can adsorb caffeine up to about 40% by weight.

9. Process for decaffeinating caffeine-containing aqueous green coffee extracts which comprises contacting said extract with activated carbon fibers which have been preloaded only with chlorogenic acid and selectively adsorbing solely caffeine onto the activated carbon fibers without adsorbing sugar, chlorogenic acid or other green coffee constituents onto the activated carbon fibers.

10. Process according to claim 9 wherein the decaffeination is carried out at temperatures from 60° to 90° C.

11. Process according to claim 9 wherein the carbon fibers are used in the form of fabrics, nonwovens, fiber mats or feltlike materials.

12. Process according to claim 9 wherein the activated carbon fibers can adsorb caffeine up to about 40% by weight.

* * * * *